Patented Apr. 12, 1932

1,853,030

UNITED STATES PATENT OFFICE

GEORGE BACHARACH, OF NEW YORK, N. Y., ASSIGNOR OF THIRTY PER CENT TO RADIO PATENTS CORPORATION, OF NEW YORK, N. Y.

MANUFACTURE OF CINNAMIC ACID

No Drawing.   Application filed April 18, 1930. Serial No. 445,523.

This invention relates to the manufacture of cinnamic acid and more particularly to an improvement of the well known Perkin's process for producing this substance. According to the Perkin's process, benzaldehyde, acetic anhydride and sodium acetate are reacted together to obtain as a product cinnamic acid.

There are two general theories as to the course of the reaction involved in this synthesis. According to the first, a condensation product of the aldehyde with the anhydride is formed, the reaction being catalyzed by the sodium acetate. According to the other, the aldehyde reacts with the sodium acetate forming an intermediate product which is dehydrated by the acetic anhydride producing the cinnamic acid.

Applicant has discovered that, regardless of which theory is subscribed to, the process can be accelerated and the yield of cinnamic acid considerably increased by adding to the reacting mixture a basic substance which appears to catalyze the reaction. An example of such a catalyst as used by the applicant is pyridine.

Accordingly an object of the present invention is to improve on the method of producing cinnamic acid by reacting benzaldehyde, acetic anhydride and sodium acetate so as to materially increase the yield of acid obtained.

Another object is to improve on the Perkin's process so as to obviate the necessity of purifying the product.

Other objects will appear as the description progresses.

The preferred method of carrying out the process is as follows:

8 drops of pyridine are added to 20 grams of freshly distilled benzaldehyde mixed with 30 grams of redistilled acetic anhydride and 10 grams of anhydrous sodium acetate.

The mixture is heated for a number of hours in an air bath at a temperature of 165° C. a reflux condenser being used. After this water is added (1200 cc.) and an excess of benzaldehyde distilled off by steam. Concentrated hydrochloric acid is now added, until the mass becomes acid to Congo red. A rapid precipitation of the cinnamic acid will be observed, which may be filtered off by suction and dried. The acid needs no further purification, its melting point being 132°. With a heating of the mixture for four hours 18.8 grams or 67.1% of the theoretical yield will be obtained. When the period of digestion is continued for 6 hours, the yield is 23.2 grams of cinnamic acid, or 83% of the theoretical, the melting point again being 132°. With a period of 8 hours digestion the yield of 23.8 grams corresponds to 85% of the theoretical.

In all these experiments a correspondingly lower amount of unchanged benzaldehyde will be recovered. A further increase of the period of digestion beyond 8 hours will not essentially change the results and it appears that the yield of the 8 hour experiment constitutes the most favorable result. The following table shows a comparison of yields obtained with pyridine as a catalyst and those obtained without pyridine:—

| Hours of digestion | Without pyridine | | With pyridine | |
|---|---|---|---|---|
| | Actual yield, g. | % of the theoretical | Actual yield, g. | % of the theoretical |
| 4 | 10.3 | 36.7 | 18.8 | 67.1 |
| 6 | 15.00 | 53.6 | 23.2 | 83 |
| 8 | 17.00 | 60.7 | 23.8 | 85 |

The invention, as having been described, is naturally subject to modification of the data given coming within the scope of the appended claims.

What I claim is:—

1. The process of producing cinnamic acid which comprises reacting benzaldehyde, acetic anhydride and sodium acetate in the presence of pyridine as a catalyst.

2. In the method of producing cinnamic acid comprising reacting together benzaldehyde, acetic anhydride and sodium acetate, the step of adding a minute quantity of pyridine as a catalyst.

3. The method of producing cinnamic acid as described in claim 2, which consists in using pyridine as a catalyst during a digestion period of at the most, eight hours, and at a temperature of about 165° C.

4. The process of producing cinnamic acid which consists in (1) heating a mixture of benzaldehyde, acetic anhydride, sodium acetate and a minute amount of pyridine for a sufficient length of time to condense substantially all the benzaldehyde (2) adding a large amount of water (3) steam distilling to remove traces of free benzaldehyde, (4) adding hydrochloric acid until the mixture is slightly acidic (5) and filtering and drying the precipitate to obtain a substantially pure product.

In testimony whereof I affix my signature.

GEORGE BACHARACH.